UNITED STATES PATENT OFFICE.

ELLIOT SAVAGE, OF WEST MERIDEN, CONNECTICUT.

IMPROVEMENT IN HARDENING STEEL.

Specification forming part of Letters Patent No. 118,882, dated September 12, 1871.

*To all whom it may concern:*

Be it known that I, ELLIOT SAVAGE, of West Meriden, in the county of New Haven and State of Connecticut, have invented a new and useful Improvement in Hardening Steel; and I do hereby declare that the following is such an exact description of the same as will enable others skilled in the art to which my invention belongs to put it into practice.

My invention relates to the heating part of the process in hardening steel before it is put into the cooling liquid by which the hardening is effected. The object of the invention is to protect the steel under operation from oxidation, and thus prevent the escape of the carbon from the steel; also, to impregnate with additional carbon the surface of the steel or such portions of the surface thereof as may contain too small a quantity of carbon to admit of hardening as steel is ordinarily hardened. The invention comprises the use of a bath composed of cyanide of potassium, chloride of sodium, and carbonate of soda, which bath may be heated by the steel under treatment in preference to employing a fused bath to heat the steel in, as described in my previous patents, which process or processes, while perfect for hardening small articles of fine quality of steel, is impracticable when larger articles of a lower grade of metal are to be treated, on account of the much higher temperature required being so destructive to the vessels containing the fused cyanide, which renders such processes unavailable on account of the expense thereby incurred.

To harden a piece of steel according to my improvement I heat the steel by any ordinary method to a temperature of about 700° Fahrenheit, and, having in readiness the bath composed of the ingredients above mentioned, put the steel therein, in order to produce upon its surface a coating or film of said ingredients. The bath may be contained in an iron or other suitable vessel, and its ingredients be in or about the following proportions, although these may be more or less varied, namely, six (6) parts, by weight, of cyanide of potassium, two (2) parts of chloride of sodium, and two (2) parts of carbonate of soda. After the heated steel has been thus coated with the ingredients of the bath I remove it from the latter and heat it in a suitable furnace or fire to a temperature of from 1,000° to 1,200° Fahrenheit, or thereabout, according to the quality of the steel; or, in other words, heat it to a cherry-red. I then place it in a cooling-bath of pure water, salt and water, or cyanide of potassium and water, or any other of the cooling solutions commonly used for cooling steel in hardening it.

The film or coating produced by the first-mentioned bath is instantly removed from the surface of the steel by the cooling-bath, leaving the surface of the steel free from the effects of oxidation, and producing a great degree of hardness.

What is here claimed, and desired to be secured by Letters Patent, is—

1. The process of hardening steel or similar metals by first heating to a low red heat, then coating in a suitable bath to prevent oxidation, and subsequently raising the heat sufficiently for hardening in the ordinary manner, essentially as specified.

2. A bath, composed of cyanide of potassium, chloride of sodium, and carbonate of soda, for use in the manner and for the purpose substantially as herein specified.

ELLIOT SAVAGE.

Witnesses:
HENRY T. BROWN,
FRED. HAYNES.

(64.)